US008884870B2

(12) United States Patent
Grant et al.

(10) Patent No.: US 8,884,870 B2
(45) Date of Patent: Nov. 11, 2014

(54) INTERACTIVE PAINTING GAME AND ASSOCIATED CONTROLLER

(75) Inventors: Danny A. Grant, Laval (CA); Erin B. Ramsay, Montreal (CA); Juan Manuel Cruz-Hernandez, Montreal (CA); David Birnbaum, Oakland, CA (US); Robert W. Heubel, San Leandro, CA (US); Hendrik Bartel, San Francisco, CA (US); Christopher J. Ullrich, Ventura, CA (US)

(73) Assignee: Immersion Corporation, San Jose, CA (US)

( * ) Notice: Subject to any disclaimer, the term of this patent is extended or adjusted under 35 U.S.C. 154(b) by 497 days.

(21) Appl. No.: 12/642,323

(22) Filed: Dec. 18, 2009

(65) Prior Publication Data

US 2010/0160041 A1 Jun. 24, 2010

Related U.S. Application Data

(60) Provisional application No. 61/139,506, filed on Dec. 19, 2008.

(51) Int. Cl.
*G09G 5/00* (2006.01)
*G06F 3/041* (2006.01)
*G06F 17/30* (2006.01)
*G06F 3/0483* (2013.01)
*G06F 3/0485* (2013.01)
*H04M 1/725* (2006.01)

(52) U.S. Cl.
CPC ........ *G06F 17/30716* (2013.01); *G06F 3/0483* (2013.01); *G06F 3/0485* (2013.01); *H04M 1/72522* (2013.01)
USPC .......................................... 345/156; 345/173

(58) Field of Classification Search
USPC ...................... 345/156, 173; 710/62; 434/114
See application file for complete search history.

(56) References Cited

U.S. PATENT DOCUMENTS 8,427,434 B1 * 4/2013 Merolla ........................ 345/173
2003/0218596 A1 * 11/2003 Eschler .......................... 345/156
(Continued)

FOREIGN PATENT DOCUMENTS

JP  2001-149645  6/2001
JP  2003-047773  2/2003
JP  2003-053036  2/2003

OTHER PUBLICATIONS

Philip Garner, The Mobile Phone as a Digital SprayCan, Jun. 2006, ACE 06.*

(Continued)

*Primary Examiner* — Dmitry Suhol
*Assistant Examiner* — Jason Yen
(74) *Attorney, Agent, or Firm* — Pillsbury Winthrop Shaw Pittman LLP

(57) ABSTRACT

A gaming concept in which each user in a single-player or a multi-player game is enabled to create artwork or graffiti work virtually or on actual surfaces using haptic-enhanced controllers. The controllers can emulate the experience of using a marker, a paint brush, a paint spray-can or the like. The components of various controllers may be modularized for easily interchanging components to extend the art or graffiti creation experience. The real life experience of using ink or paint on a surface is simulated by haptic feedback. When a paint spray-can controller is used, the experience of paint consumption is recreated by various peripheral enhancements including audio and haptic sensations communicated to the user.

22 Claims, 10 Drawing Sheets

(56) References Cited

U.S. PATENT DOCUMENTS

| | | | |
|---|---|---|---|
| 2006/0024647 A1* | 2/2006 | Chesnais et al. | 434/114 |
| 2006/0171771 A1* | 8/2006 | Kruse | 401/218 |
| 2006/0288137 A1* | 12/2006 | Grant et al. | 710/62 |
| 2007/0146316 A1* | 6/2007 | Poupyrev et al. | 345/156 |

OTHER PUBLICATIONS

WiiPlayable, Paint, Dec. 17, 2007, http://www.wiiplayable.com/playgame.php?gameid=230.*

Lin et al., DAB: Interactive Haptic Painting with 3D Virtual Brushes, University of North Carolina at Chapel Hill, 2001, http://gamma.cs.unc.edu/DAB/.*

Lin et at., inTouch: Interactive Multiresolution Modeling and 3D Painting with a Haptic Interface, 1999, http://gamma.cs.unc.edu/INTOUCH/.*

Lang, et al., "CoolPaint: Direct Interaction Painting" [online], User Interface Software Technology (UIST) Proceedings, 2003, pp. 1-2, [retrieved on Mar. 12, 2010]. Retrieved from the Internet: <URL: http://citeseerx.ist.psu.edu/viewdoc/download?doi=10.1.1.84.2939&rep=rep1&type=pdf>.

Baxter, et al., "DAB: Interactive Haptic Painting with 3D Virtual Brushes" [online], SIGGRAPH 2001 Proceedings, 2001, pp. A180-A187, [retrieved on Mar. 12, 2010]. Retrieved from the Internet: <URL: http://delivery.acm.org/10.1145/1200000/1198618/a180-baxter.pdf?key1=1198618&key2=0634148621&coll-GUIDE&dl=GUIDE&CFID=81671090&CFTOKEN=35940521>.

Vandoren, et al., "IntuPaint: Bridging the Gap between Physical and Digital Painting", 2008 IEEE International Workshop on Horizontal Interactive Human Computer System (TABLETOP), Oct. 1, 2008, pp. 65-72.

Williamson, et al., "Shoogle: Excitatory Multimodal Interaction on Mobile Devices", CHI 2007 Proceedings, Shake, Rattle, and Roll: New Forms of Input & Output, Apr. 28-May 3, 2007, pp. 121-124.

Garner, et al., "The Mobile Phone as a Digital SprayCan" [online], ACE 06, Jun. 14-16, 2006, 7 pages, [retrieved on May 21, 2010]. Retrieved from the Internet: <URL: http://delivery.acm.org/10.1145/1180000/1178838/a12-garner.pdf?key1=1178838&key2=7099444721&coll=GUIDE&d1=GUIDE&CFID=89156485&CFTOKEN=20422104>.

Anonymous, "Virtual Graffiti—A Sign of the Future?" [online], DW-WORLD.DE, Feb. 14, 2005, 1 page, [retrieved on May 21, 2010]. Retrieved from the Internet: <URL: http://www.dw-world.de/dw/article/0,1564,1481993,00.html>.

International Search Report and Written Opinion as issued for PCT/US2009/068797, dated Jun. 10, 2010.

International Preliminary Report on Patentability as issued for International Application No. PCT/US2009/068797, dated Jun. 30, 2011.

Office Action issued for Japanese Patent Application No. 2011-542497, dated Mar. 18, 2014.

* cited by examiner

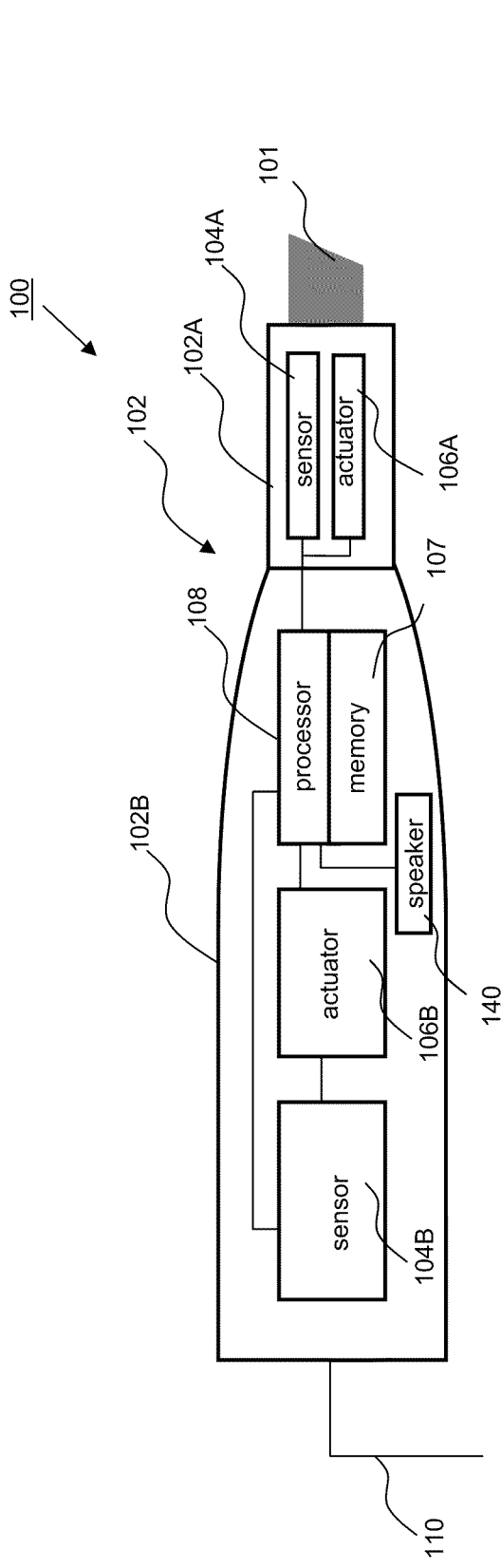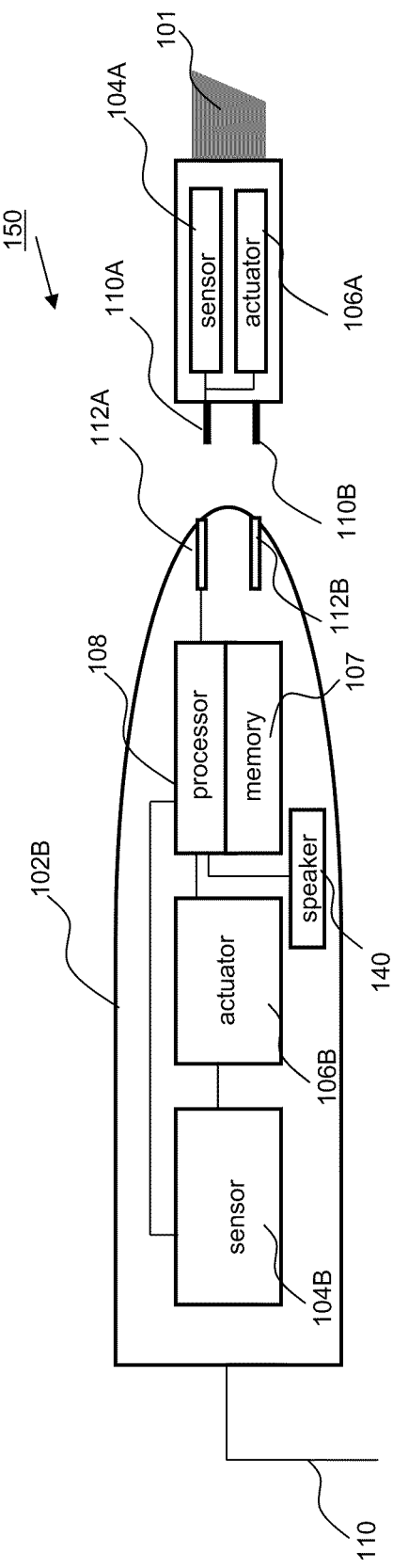

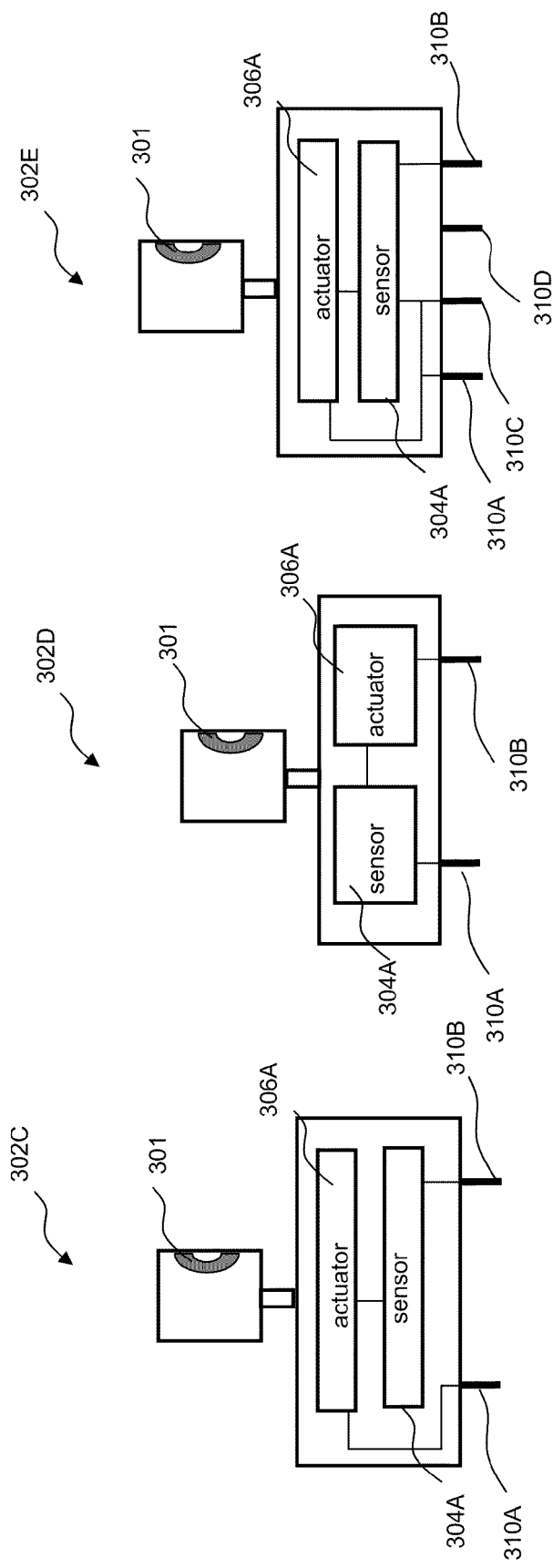

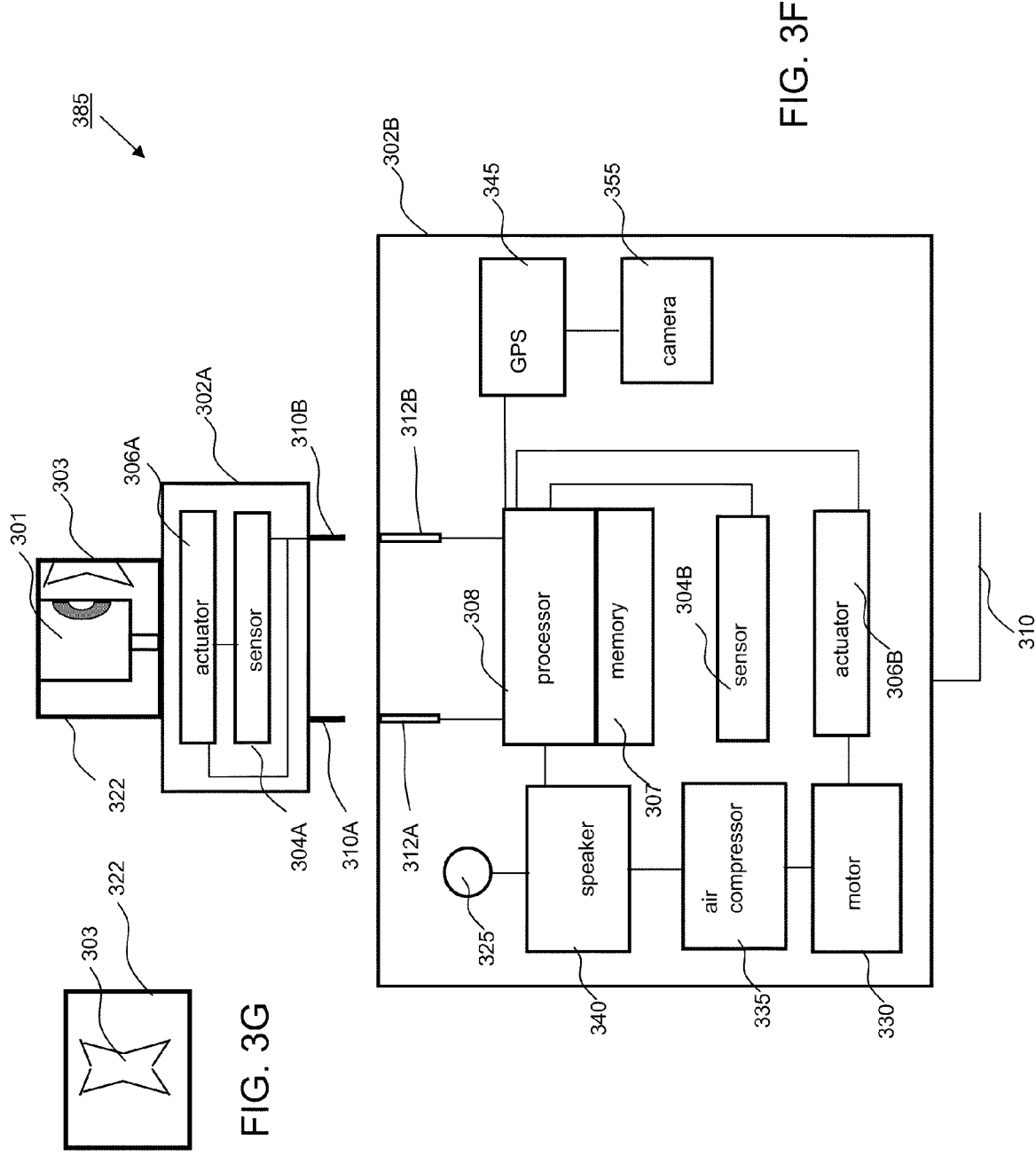

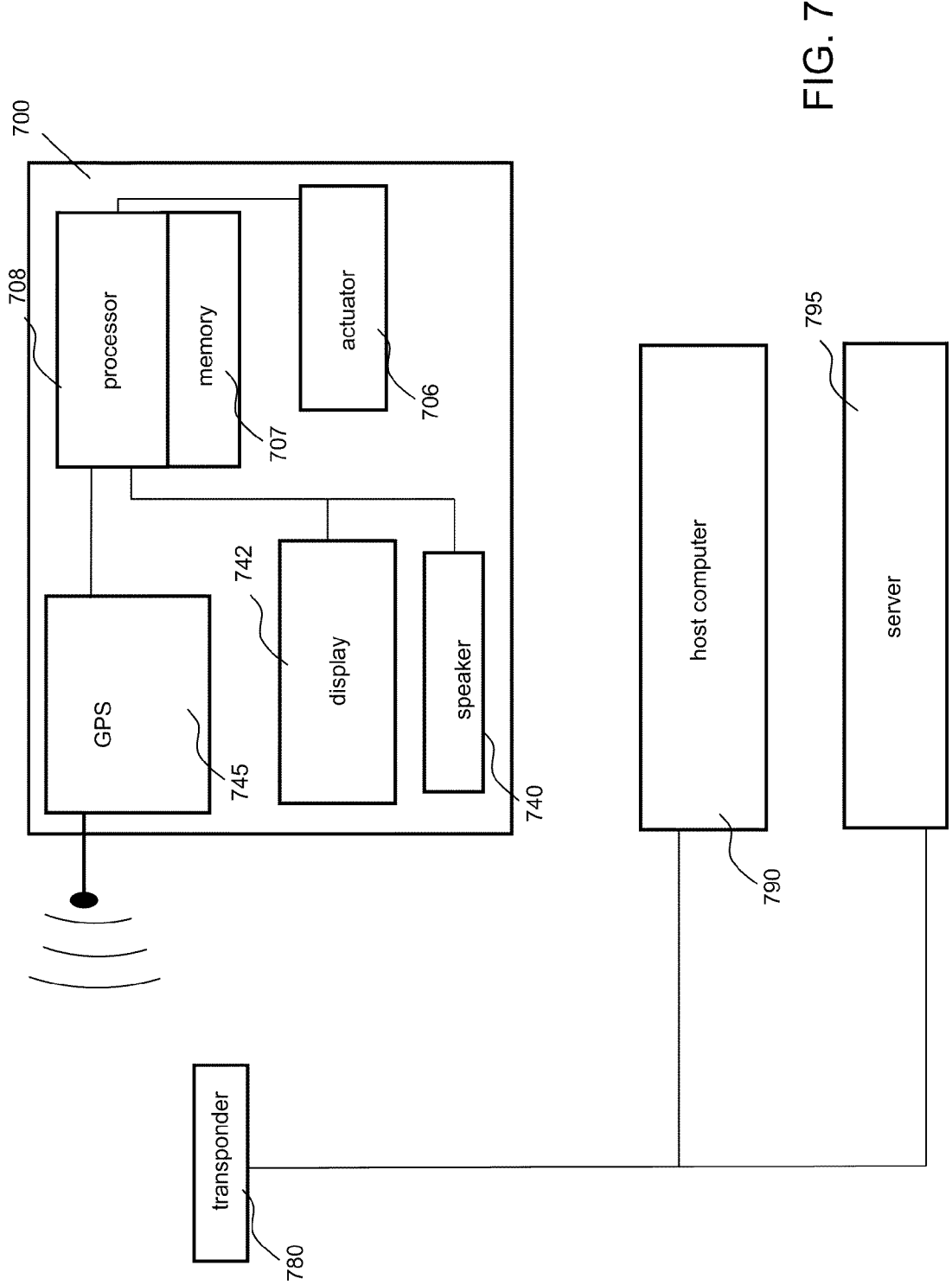

US 8,884,870 B2

INTERACTIVE PAINTING GAME AND ASSOCIATED CONTROLLER

CROSS-REFERENCE TO RELATED APPLICATIONS

This application claims the benefit of priority from U.S. Provisional Patent Application Ser. No. 61/139,506, filed on Dec. 19, 2008, the content of which is incorporated herein by reference in its entirety.

FIELD

The present disclosure relates generally to an interactive painting game and associated controller.

BACKGROUND

Video games and video game systems have become even more popular due to the marketing toward, and resulting participation from, casual gamers. Popular video game and computer systems have painting-based games in which regular palm-type controllers or a computer mouse has been used to move a displayed virtual paintbrush on a virtual canvas. However, there is no handheld game controller and accompanying software game which immerses the user into a realistic gaming experience of painting or drawing on real or virtual surfaces.

SUMMARY

Embodiments of the present invention disclose a gaming concept in which each user in a single-player or a multi-player game is enabled to generate visual art, which may be real or virtual markings on a real or virtual surface using haptic-enhanced controllers. The visual art may be artwork or graffiti work that is created virtually, i.e. on virtual surfaces, or on actual surfaces. The controllers can emulate the experience of using a marker, a paint brush, a paint spray-can or the like. The components of various controllers may be modularized for easily interchanging components to extend the art or graffiti creation experience. The real life experience of using ink or paint on a surface is simulated by haptic feedback and may be enhanced by audio effects. When a paint spray-can controller is used, the experience of paint consumption is recreated by various peripheral enhancements including audio and haptic sensations communicated to the user.

According to an aspect of the invention, there is provided a system that includes a computer configured to run a software program designed to display a graphical simulation on a display. The software program is configured to allow a user to generate visual art in the graphical simulation. The system includes a user graspable controller configured to be freely moveable in a three dimensional space. The controller includes a sensor configured to track positional and orientative values of the controller in the three dimensional space and transmit a sensor signal representative of the positional values to the computer, and an actuator configured to output a haptic effect to the user upon receiving a control signal from a processor coupled to the controller. The user graspable controller is representative of a writing and painting instrument configured to generate the visual art.

According to an aspect of the invention, there is provided a game that includes a user graspable controller configured to be freely moveable in a three dimensional space by a user. The controller includes a position sensor configured to track a three-dimensional position, orientation, and geographical location of the controller. The controller is configured to place a data tag at a location where the user designates via the controller, the controller configured to send a signal after the controller places the data tag. The game includes a host computer remote from the controller and configured to run a software program. The host computer is configured to identify the user from the received signal and to store the location of the data tag, wherein information of the stored data tag and identity of the user is capable of being accessed from the host computer. Other data about the tag may also be stored, such as its shape, texture, other aspects of its appearance, timestamp, gesture, etc.

According to an aspect of the invention, there is provided a game that includes a plurality of uniquely identifiable controllers configured to be freely moveable in a three dimensional space by respective users. Each controller includes a position sensor configured to track a physical position of the controller in the three dimensional space. Each controller is configured to place a data tag on a surface at different user-designed locations. Each controller is configured to send a corresponding signal upon the controller placing the data tag. The game includes a host computer remote from the controllers and configured to run a software program. The host computer is configured to identify each user from each received signal and to store the location of the data tag, wherein information of the stored data tag and identity of the users is capable of being accessed from the host computer.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments, and in which:

FIG. 1A and FIG. 1B illustrate side views of game controllers in the shape of a marker in accordance with embodiments of the invention;

FIGS. 3C-3E illustrate embodiments of detachable top portions of a paint spray-can game controller shown in FIG. 3B;

FIG. 3F illustrates an enhanced paint spray-can game controller according to an embodiment of the invention;

FIG. 3G illustrates a stencil according to an embodiment of the invention;

FIG. 7 illustrates a block diagram of a viewer in accordance with an embodiment of the invention.

DETAILED DESCRIPTION

Example embodiments are described herein in the context of an interactive painting game and associated controller. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. It is understood that the phrase "an embodiment" encompasses more than one embodiment and is thus not limited to only one embodiment. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

Figure 2A:
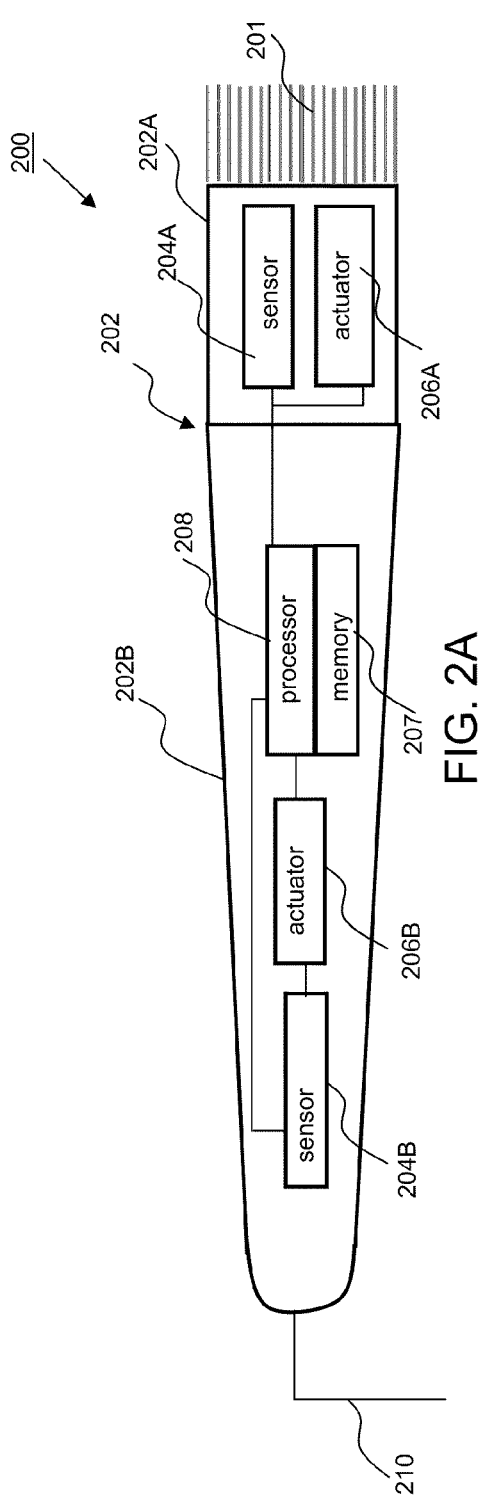
FIG. 2A and FIG. 2B illustrate side views of game controllers in the shape of a paint brush in accordance with embodiments of the invention.
Figure 2B:
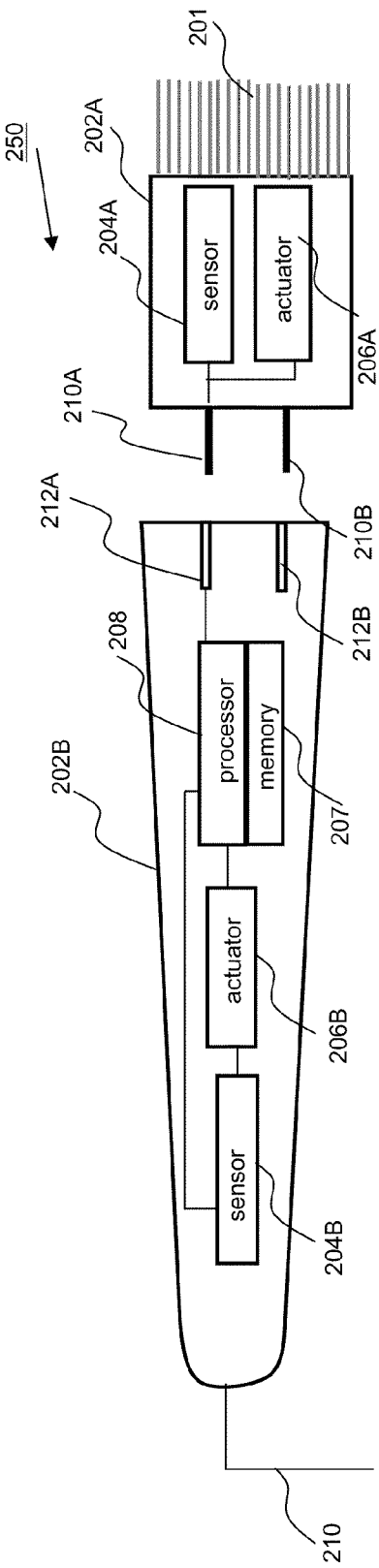
Figure 3A:
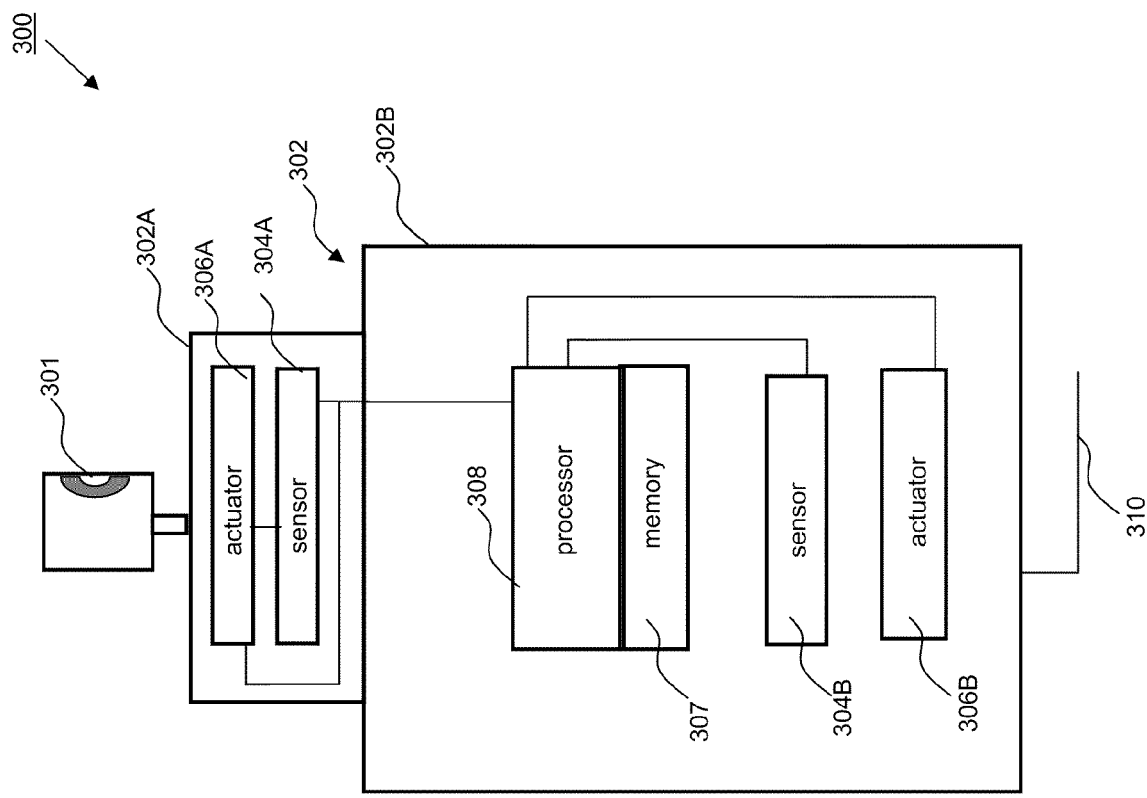
FIG. 3A and FIG. 3B illustrate side views of game controllers in the shape of a paint spray-can in accordance with embodiments of the invention.
Figure 3B:
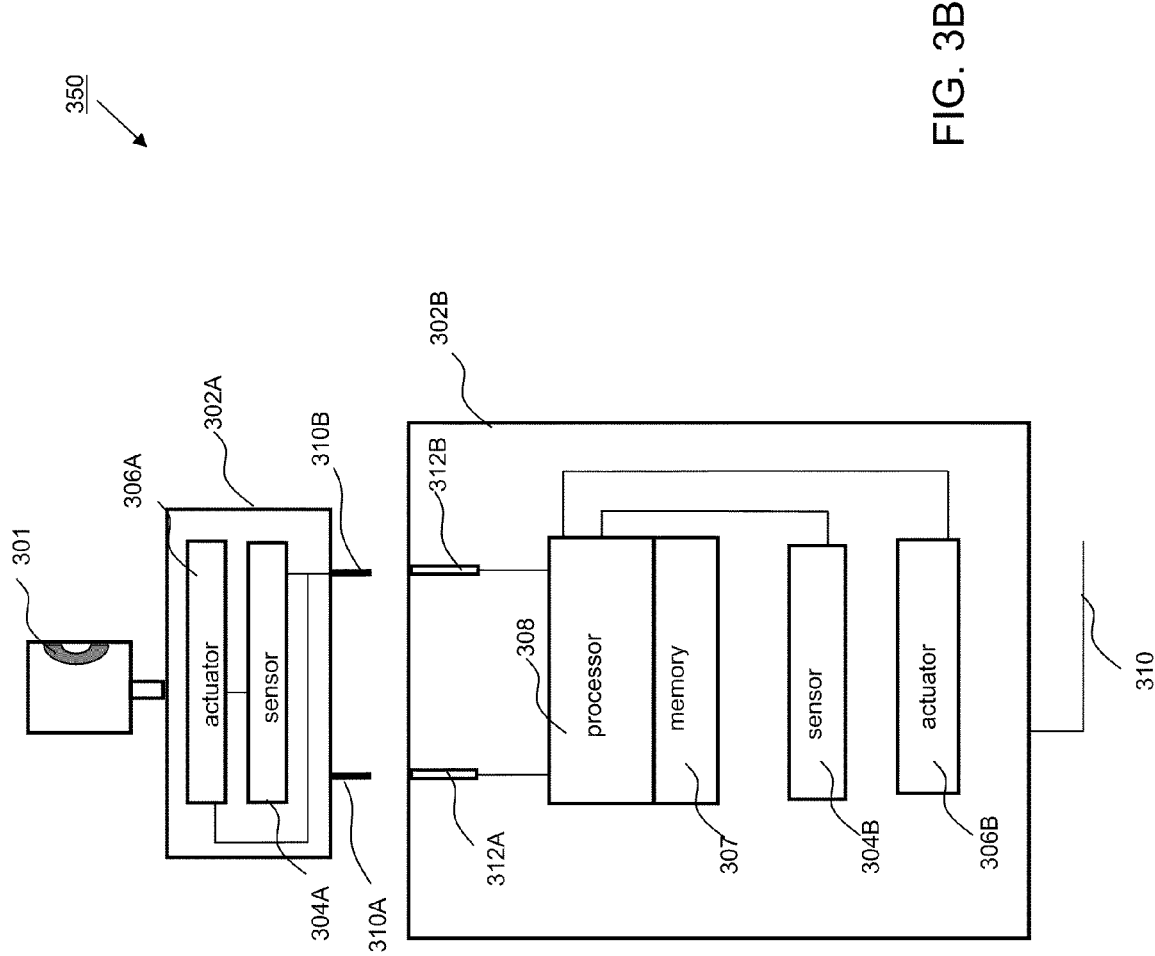

FIGS. 1A-B, 2A-B, 3A-B and 3F illustrate various haptically enabled writing/painting instrument controllers for use with a game in accordance with embodiments of the invention. FIGS. 1A and 1B represent two embodiments 100 and 150 of marker-type controllers for use with an interactive game. FIGS. 2A and 2B illustrate two embodiments 200 and 250 of paintbrush-type controllers for use with an interactive game. FIGS. 3A, 3B, and 3F illustrate different embodiments of paint spray-can-type controllers 300, 350 and 385 for use with an interactive game. It should be noted that the controllers shown in the Figures are only examples and any other design is contemplated. In an embodiment, the controller may be a mobile phone, smart phone, mobile computer, digital camera, personal gaming system (e.g. PSP, Nintendo DS), computer mouse, light pen, stylus, and the like.

In particular, the marker-type controller 100 shown in FIG. 1A includes a body 102 shaped like a marker having a tip 101. The body 102 of the controller has two parts: a tip part 102A, and a main body part 102B. Parts 102A and 102B may be integral or monolithic, as shown in embodiment 100 in FIG. 1A, or comprising detachable modules, as shown in embodiment 150 in FIG. 1B. In the detachable tip embodiment of the controller, a suitable coupler may be used to removeably attach the tip part 102A of the body to the main body part 102B. For example, in embodiment 150, pins 110A-B protrude from the tip part 102, that can be snugly coupled to the corresponding complementary slots 112A-B in the main body part 102B. The slots 112A-B may be in the tip part 102A, and the pins 110A-B may be in the main body part 102B in certain embodiments. The number and position of pins and slots may vary. Other types of mechanical and/or magnetic coupling mechanisms may be used instead of the pin/slot configuration. However the coupler should provide a conduit for wired (shown in thin lines) and wireless connections between the functional blocks (shown with thick outlines) housed within the body 102. Controller 100 also includes one or more sensors 104A-B, one or more actuators 106A-B, a local processor 108 coupled to the one or more sensors 104A-B as well as the one or more actuators 106A-B and an input/output port 110 which may be wired, as shown, or wireless using any appropriate known technology to allow the controller 100 to communicate with another device, such as a host computer (e.g. video game console, server, desktop computer) not shown in FIG. 1A. The controller 100 may also include a speaker 140 that is coupled to the local processor 108 and is configured to project sounds related to the use of the controller 100. The controller 100 may be configured to house an ink cartridge within, whereby the cartridge supplies ink to the tip 101 for application onto a surface. In another embodiment, the controller 100 is not configured to actually apply ink or paint to a surface and just only applies "virtual ink" or "virtual paint."

In an embodiment, the marker controller 100 includes a tip sensor 104A as well as a body sensor 104B, whereby the tip sensor 104A monitors when the tip 101 comes into contact with a real surface and sends a tip sensor signal to the local processor 108 coupled to a local memory 107. The local processor 108 may then indicate to a host computer (e.g., host computer 690 shown in FIG. 6) that the user is ready to apply ink onto the surface based on the host computer commands or user commands. It should be noted that instead of a tip sensor 104A, the controller 100 may include a button (not shown) that sends a similar sort of indication to the host computer that the user is ready to apply ink onto the surface.

A body sensor 104B may also be incorporated in the controller 100 as shown in FIG. 1A, whereby the body sensor 104B monitors and tracks movement of the controller in a two or three dimensional space. Such a body sensor may include a two or three dimensional capable accelerometer, gyroscope or other appropriate type of mechanism. The body sensor 104B alternatively uses light, optics, infrared, RFID or other like technology to communicate the position, velocity and/or acceleration values of the controller 100 to the host computer. In another embodiment, the controller is used in conjunction with a touch screen or touch pad. It is contemplated in this embodiment, that the tip 101 is in contact with or near the touch surface of the touch screen or touch pad, whereby movement of the tip 101 is preferably tracked along the touch screen or touch pad. In response, the host computer dynamically updates the graphical environment run by the software.

In addition, the controller 100 may include a tip actuator 106A which is configured to output a haptic effect upon receiving a control signal from the processor 108. The haptic effect may be a pop, click, vibration or other haptic effect, whereby the actuator 106A outputs an appropriate haptic effect that provides the user with a realistic feeling or indication of the marker 100 touching a surface.

Additionally or alternatively, a body actuator 106B preferably positioned within the body 102 of the controller 100 outputs a haptic effect upon receiving a corresponding control signal from the processor, whereby the body actuator 106B provides the user with a realistic feeling of the marker being used. Such haptic effects include, but are not limited to, a vibration, jolt, damping effect, etc. The vibration output by either or both actuators 106A, 106B may depend on the amount of force applied onto the marker by the user, whereby the tip sensor 104A senses the amount of force (or distance that the tip 101 moves). For example, the vibration output by either or both actuators 106A, 106B may increase as the user presses the marker 100 harder onto the surface, whereas the vibration output by either or both actuators 106A, 106B may decrease as the user relieves the force applied to the surface. It should be noted that the software is programmed to accordingly send the control signals to the tip and/or body actuators based on game play.

With regard to the brush controller 200 embodiment in FIG. 2A, the controller is shown to include a body 202 having a bristled tip 201. The body of the controller has two parts: a main body part 202B and a tip part 202A. Parts 202A and 202B may be integral or monolithic (as shown in embodiment 200 in FIG. 2A), or comprising detachable modules, as shown in embodiment 250 in FIG. 2B. Complementary fastening mechanisms 210A-B and 212A-B are used to couple the main body part 202B with the tip part 202A.

Controller 200 includes one or more sensors 204A-B, one or more actuators 206A-B, a local processor 208 coupled to the one or more sensors 204A-B as well as the one or more actuators 206A-B and an input/output port 210 which may be wired, as shown, or wireless using any appropriate known technology to allow the controller 200 to communicate with one or more host computers. The controller 200 may be configured to house an ink or paint cartridge within, whereby the cartridge supplies ink or paint to the brush 201 for application to a surface based on the host computer commands or user commands. In another embodiment, the controller 200 is not configured to actually apply ink or paint to a surface and just only applies "virtual ink" or "virtual paint" via the brush 201. It is contemplated that the controller 200 may be configured to allow the user to dip the bristled tip 201 into paint, whereby the bristled tip 201 acts as a real paintbrush in being capable of applying paint onto a surface. Although not illustrated in the Figures, the controller 200 may also include a speaker, like the speaker 140 of the controllers 100, 150 illustrated in FIGS. 1A and 1B, that is configured to emit sounds associated with the use of the controller 200.

In an embodiment, the marker controller 200 includes a tip sensor 204A as well as a body sensor 204B, whereby the tip sensor 204A monitors when the bristle tip 201 comes into contact with a real or virtual canvas and thereby sends a tip sensor signal to the local processor 208 (coupled to a local memory 207) and/or host computer (not shown in FIG. 2A-2B). Preferably, the local processor 208 indicates to the host computer that the user is engaged in applying paint onto a surface. It should be noted that instead of a tip sensor 204A, the controller 200 may include a button (not shown) that sends a similar indication to the host computer once the user presses the button.

A body sensor 204B may also be incorporated in the controller 200 as shown in FIG. 2A, whereby the body sensor 204B monitors and tracks movement of the controller in a two or three dimensional space. Such a body sensor may include a two or three dimensional capable accelerometer, gyroscope or other appropriate type of mechanism. The body sensor 204B alternatively uses light, optics, infrared, RFID or other like technology to communicate the position, velocity and/or acceleration values of the controller 200 to the host computer. In another embodiment, the controller is used in conjunction with a touch screen or touch pad. It is contemplated in this embodiment, that the tip 201 is in contact with the touch screen or touch pad, whereby movement of the tip 201 is preferably tracked along the touch screen or touch pad. In response, the host computer dynamically updates the graphical environment run by the software.

In addition, the controller 200 may include a tip actuator 206A which is configured to output a haptic effect upon receiving an appropriate control signal from the processor 208. The haptic effect may be a pop, click, vibration, texture or other haptic effect, whereby the actuator 206A outputs an appropriate haptic effect that provides the user with a realistic feeling of the brush controller 200 touching a surface.

Additionally or alternatively, a body actuator 206B positioned within the body 202B of the controller 200 may output a haptic effect which provides the user with a realistic feeling of a brush being used. Such haptic effects include, but are not limited to, a vibration, jolt, damping effect, etc. The vibration output by either or both actuators 206A, 206B may depend on the amount of force applied onto the brush tip by the user, whereby the tip sensor 204A senses the amount of force (or distance that the brush tip 201 moves). For example, the vibration or texture, output by either or both actuators 206A, 206B may increase as the user presses the brush controller 200 harder onto the surface, whereas the vibration output by either or both actuators 206A, 206B may decrease as the user relieves the force applied to the surface.

With regard to the paint spray-can controller embodiment 300 in FIG. 3A, the controller 300 is shown to include a body 302 having a nozzle 301, one or more sensors 304, one or more actuators 306, a local processor 308 coupled to a local memory 307, and also coupled to the one or more sensors 304, as well as the one or more actuators 306, An input/output port 310, which may be wired, as shown, or wireless using any appropriate known technology, is included to allow the controller 300 to communicate with one or more host computers (not shown). The controller 300 may be configured to house a spray paint cartridge within whereby the cartridge supplies paint which is ejected out of the nozzle 300 for application to a surface. In another embodiment, the controller 300 is not configured to actually apply ink or paint to a surface and just only applies "virtual paint."

Figure 5:
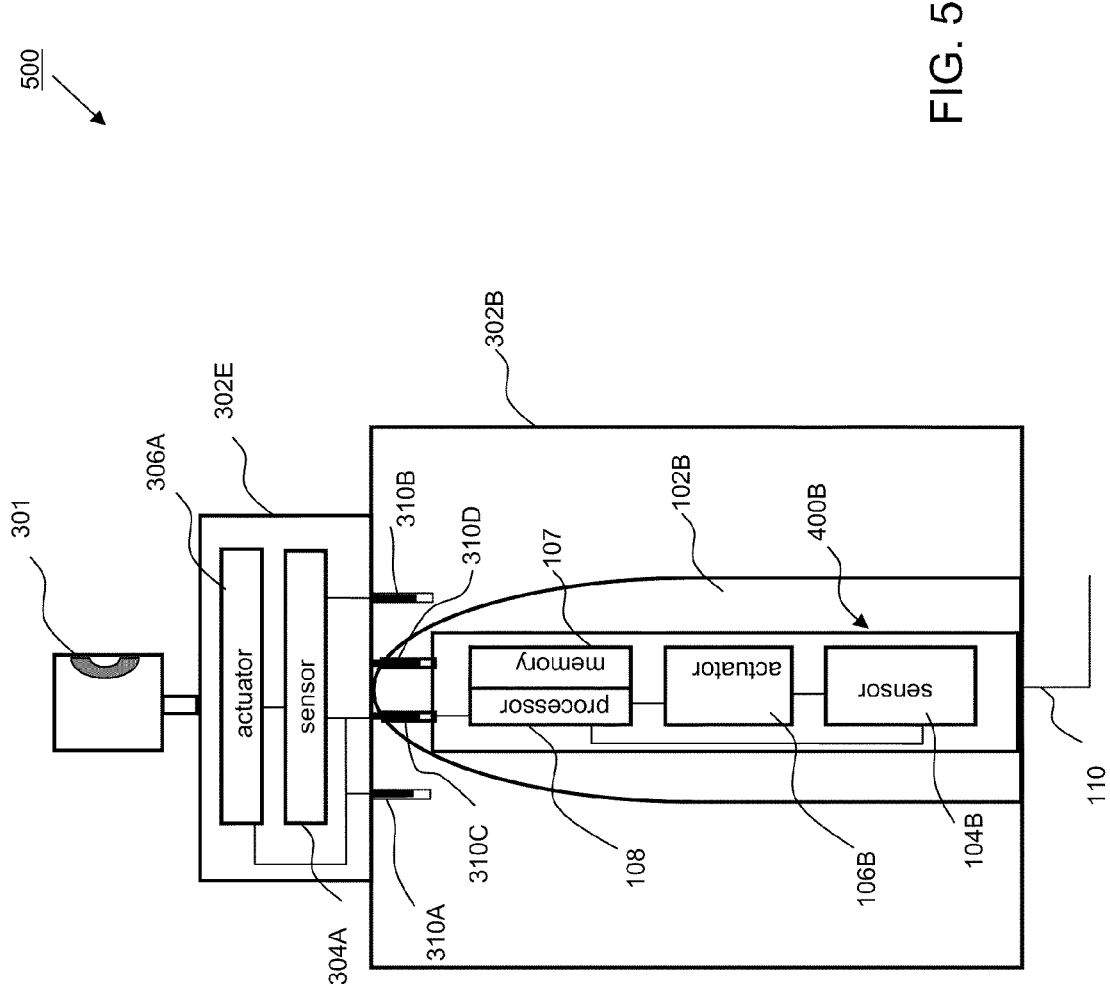
FIG. 5 illustrates a hybrid type game controller according to an embodiment of the invention.

The body of the controller has two parts: a main body part 302B and a tip part 302A. Parts 302A and 302B may be integral or monolithic, as shown in embodiment 300 in FIG. 3A, or detachable, as shown in embodiment 350 in FIG. 3B. Complementary fastening mechanisms 310A-B and 312A-B are used as a coupler to couple the main body part 302B with the tip part 302A, as shown in FIG. 3B. The detachable tip part 302A may have various alternative configurations. FIGS. 3C-3E illustrate three example configurations 302C, 302D, and 302E of the tip part 302A. Configurations 302A, 302C, 302D and 302E have different physical arrangement of the functional blocks (shown in thick outlines) and internal wiring or wireless connections (shown in thin lines) leading to the fastening mechanisms 310A-B. Persons skilled in the art will appreciate that the scope of the invention is not limited by the physical arrangement of the functional blocks and wiring/wireless connections. Tip configuration 302E shows two sets of fastening mechanisms, 310A-B and 310C-D. Fastening mechanisms 310A-B may be used when a regular paint spray can mode is used, and fastening mechanisms 310C-D may be used when a blended marker/spray can mode is used, as shown in FIG. 5.

In an embodiment, the controller 300 includes a nozzle sensor 304A as well as a body sensor 304B. The nozzle sensor 304A preferably monitors when the nozzle 301 is pressed by the user, although it is possible for the sensor 304A to measure the amount of distance that the nozzle 301 is pressed or released by the user. The nozzle sensor 304A is configured to send a nozzle sensor signal to the local processor 308 and/or host computer indicating when the nozzle is pressed 301 and/or how far nozzle is pressed by the user. Preferably, the local processor 308 indicates to the host computer (not shown) if and how far along the nozzle 301 is pressed. The software allows the host computer to correspondingly display the virtual sprayed paint on the displayed surface. It is possible for the software to represent the paint becoming more intense or less intense based on far down the user pushes the nozzle 301 (e.g. lighter showing of paint when nozzle is lightly pressed). It should be noted that instead of a nozzle sensor 304A, the controller 300 may include another type button (not shown) that sends a similar indication to the host computer once the user presses the button.

In addition, the controller 300 may include a nozzle actuator 306A which is configured to output a haptic effect upon receiving a corresponding control signal from the processor 308. The haptic effect may be a pop, click, vibration or other haptic effect, whereby the actuator 306A outputs an appropriate haptic effect to the nozzle that provides the user with a realistic feeling via the user's digit that the can 300 is being operated. It is contemplated that the nozzle actuator 306B or separate device produces an opposing force as the nozzle 301 is pressed down.

Additionally or alternatively, a body actuator 306B preferably positioned within the body 302 of the controller 300 outputs a haptic effect which provides the user with a realistic feeling of the can 300 being used. The vibration output by either or both actuators 306A, 306B may depend on the amount of "virtual spray paint" comes out of the nozzle. For instance, the vibration produced by the nozzle and/or body actuators would preferably have a greater magnitude when the nozzle 301 is sensed pressed at or near a predetermined threshold distance (e.g. furthest distance from neutral) as opposed to a lighter magnitude when the nozzle 301 is lightly pressed.

The basic paint spray-can embodiments of FIGS. 3A and 3B may be enhanced by adding a number of functional components as peripherals or as integrated/embedded devices within the controller. The added components facilitate in enhanced user experience. For example, FIG. 3F shows an enhanced paint spray-can embodiment 385, which includes a shakable rattle/ball 325, a co-located speaker 340, an air compressor 335, a tailored motor 330, and optionally a GPS device 345, and a camera 355. Persons skilled in the art will understand that not all of these devices may be included in a single embodiment, and different embodiments may have different combinations of the additional components.

In an embodiment, air compressor 335 or other like device expels air out of the nozzle 301 when the user presses down on the nozzle 301. In discharging the air, the air compressor 335 causes the spray-can controller to feel as if it is becoming lighter. Air compressor 335 may be connected to the speaker 340, so that the air release sound is amplified. Audio is often a key enhancer of user experience. Therefore, in an embodiment, co-located speaker 340 is included. Other features may be included on the spray-can controller to make the experience of using the controller more realistic. For instance, the controller 385 may include a shakable rattle/ball 325 within its body to mimic a real spray-can when it is shaken. The sound of the rattle being shaken can be amplified by the co-located speaker 340. Different viscosity feeling may be simulated and associated with the rattle shaking as more paint is consumed, and paint level in the can is getting lowered.

Haptics feedback are generated by tailored motors 330 coupled to actuator 306B for simulating a realistic spray-can use experience. Further, the spray-can controller may include a Peltier or other cooling device coupled to the outer surface which makes the outer surface of the spray-can controller feel cooler as more air is discharged.

GPS 345 and camera 355 may enhance the experience in an online multi-player game, as will be discussed with reference to FIG. 7.

Figure 4:
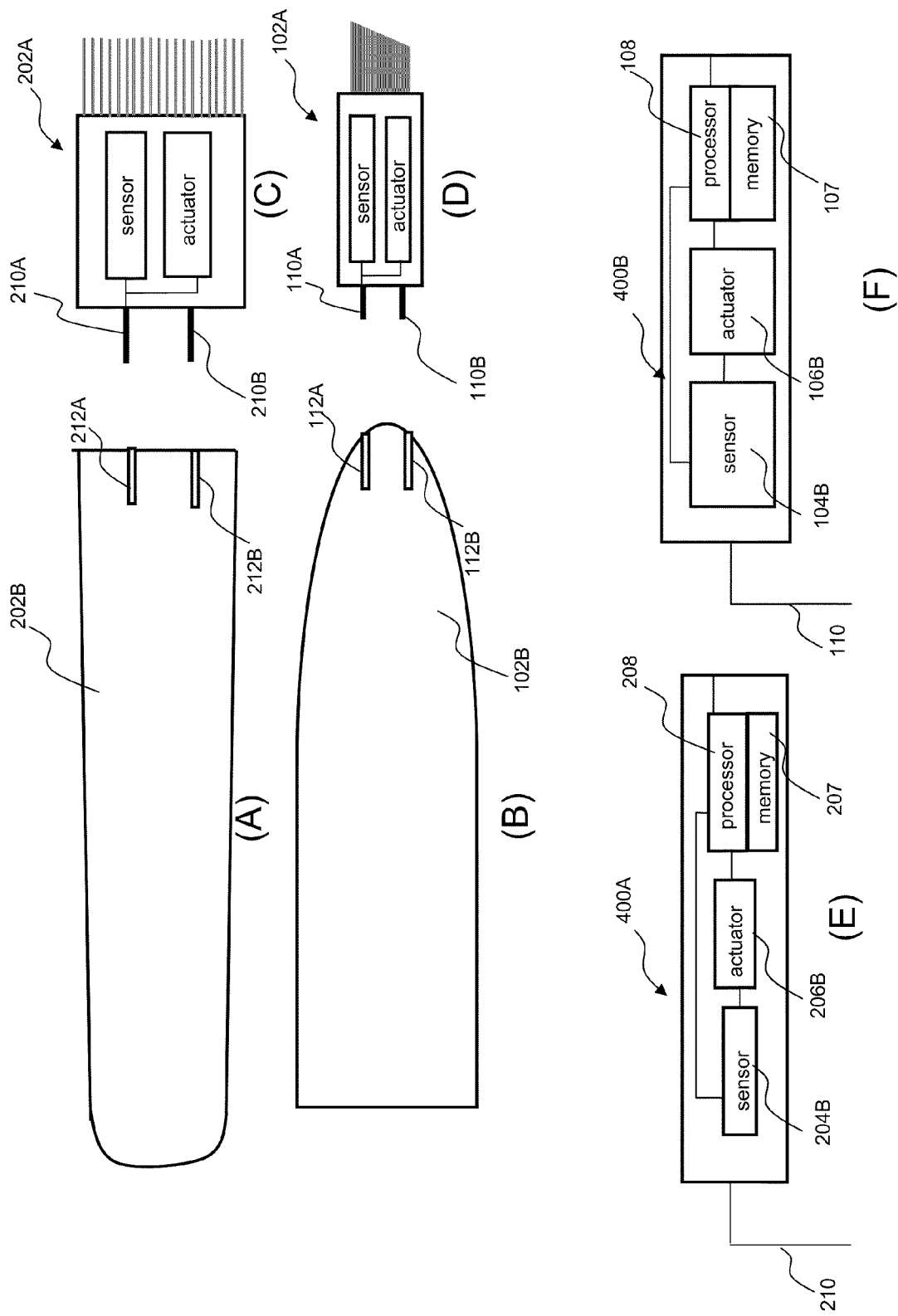
FIG. 4 illustrates various detachable components of game controllers according to embodiment of the invention.

FIG. 3G shows a front view of an external fitted cap 322 with a stencil 303 that may be used in association with the nozzle 301, when properly aligned. In FIG. 3F, the side view of the cap 322 and the aligned stencil 303 are shown. Persons skilled in the art will appreciate that different stencil shapes can be accommodated either by coupling a real cap like cap 322, or by simulating a stencil shape by software. Users may be given the flexibility of choosing a preferred stencil shape from a suite of available shapes It is further conceived that the controllers might be modularized into three main components, tip part, main body part and core circuit, as shown in the examples in FIG. 4. FIG. 4 shows various tip parts, such as, paint brush tip part 202A (FIG. 4(C)), and marker tip part 102A (FIG. 4(D)), various main bodies, e.g. pain brush body 202B (FIG. 4(A)) and marker body (FIG. 4(B)), and various core circuits, e.g., paint brush core circuit 400A (FIG. 4 (E)), and marker core circuit 400B (FIG. 4(F)), This type of modularization of the controllers would allow for mixing modifying components for new hardware configurations and user experiences without having to switch to other controllers. This modular component system would also allow for such things as housing smaller controller bodies within larger bodies; for instance having a marker body housed inside a spray can housing such that the user could remove the marker tip for quick interactions in concert with the spray can body. An embodiment of a marker body inserted into a spray can body is shown in the spray can embodiment 500 in FIG. 5. Note that the internal wiring and fastening mechanism configuration of tip portion of the body 302E supports an operation in conjunction with a marker controller body 102B and a marker controller core circuit 400B In any or all of the above described controllers, the controller may include one or more directional pads thereon which are configured to operate various features during game play. For instance, the directional pads may be used to manipulate the user's simulated character and/or the displayed brush or spray-can in the graphical environment.

Figure 6:
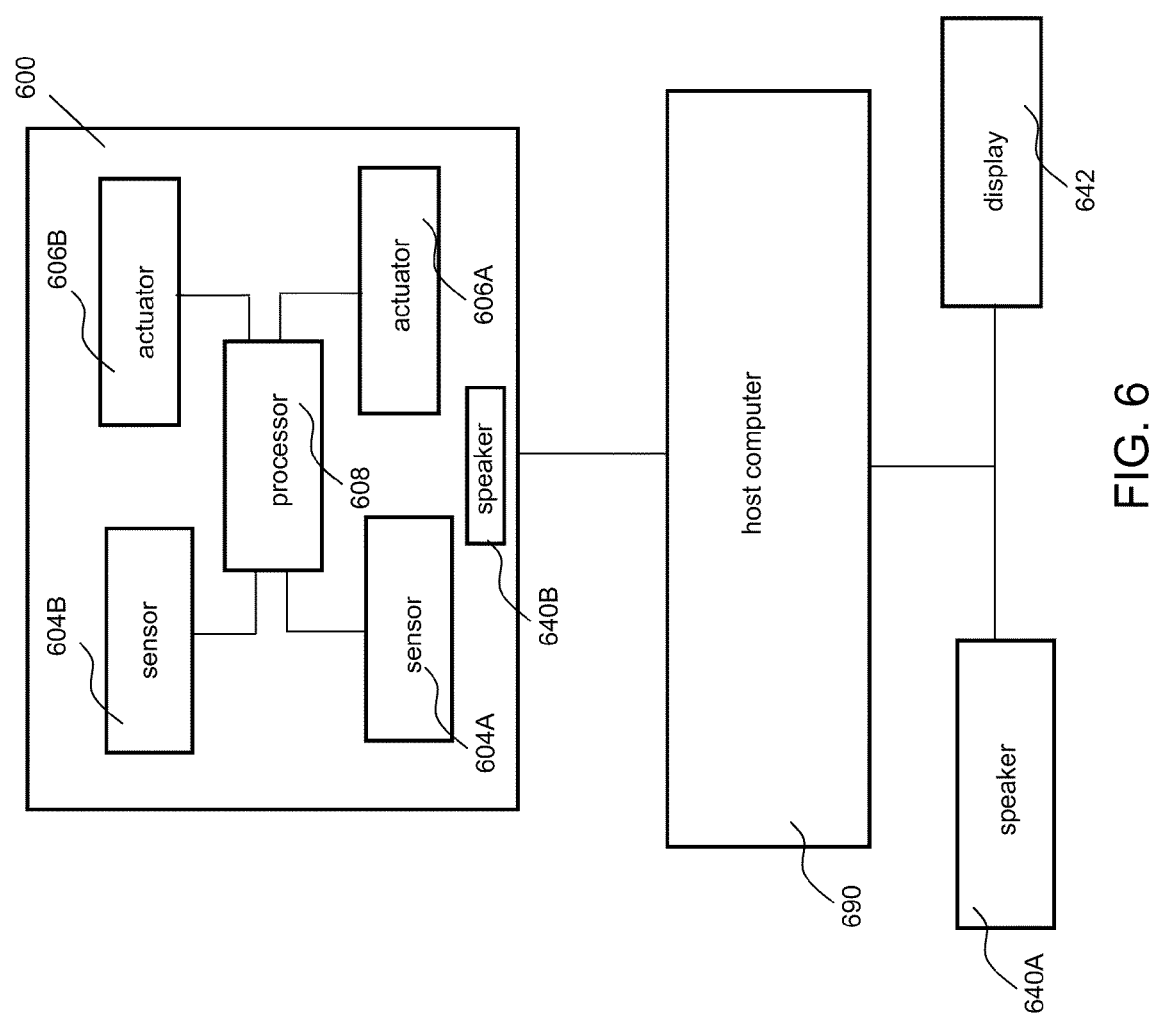
FIG. 6 illustrates a block diagram of a game controller in use with a gaming system in accordance with an embodiment of the invention.

FIG. 6 illustrates a block diagram of a controller 600 in use with a host computer 690 running a software program. For sake of brevity of the description hereinafter, the term "controller" will be discussed generally as controller 600, although it should be noted that any of the above described controllers, i.e., the marker controller, the paint brush controller, the spray can controller or a combination thereof, may be used as well.

With regard to the one or more actuators of the controller, the local processor 608 preferably provides haptic effect signals to the actuators 606A-B based on high level supervisory or streaming commands from the host computer 690. In the streaming embodiment, the voltage magnitudes and durations are streamed to the controller 600 where information is provided by the host computer 690 to the actuators 606A-B. In operation, the host computer 690 may provide high level commands to the local processor 608 such as the type of haptic effect to be output (e.g. vibration, jolt, detent, pop, etc.) by one or more selected actuators, whereby the local processor 608 instructs the actuators 606A-B as to particular characteristics of the haptic effect which is to be output (e.g. magnitude, frequency, duration, etc.) The haptic effects thereby provide the user with the feeling that the controller 600 feels similar to an actual writing/painting device.

In an embodiment, the host computer 690 may be a dedicated video gaming system, such as a Playstation, Xbox, or Wii. In an embodiment, the host computer 690 may be or be coupled to one or more servers in communication with the controller 600, whereby at least a portion of the software program is run on one or more of the servers and/or the host computer. In an embodiment, the software is configured to allow online gaming or Massively Multiplayer Online Gaming (MMOG), whereby the software may be operated on several remote and/or local servers simultaneously.

In an embodiment, the software may be used to allow the user to produce a virtual painting or drawing by tracking the user's movements of the controller 600 in two or three dimensions using the body and/or tip sensors 604A-B. For instance, the software may display a virtual or graphical representation of the user's marker, paintbrush or spray-can in front of a surface (i.e. first person view), whereby the software correspondingly moves a graphical representation of the user's marker, paintbrush or spray-can in response to the tracked movements of the controller 600. The software preferably allows the user to select different colors and types of writing/painting instruments (e.g. pen, charcoal, paint brush, etc.) using the controller 600 and causes the graphical hand and associated writing/painting tool to mimic the user's real life movements, including fluid natural movements of hand in arcs and arbitrary trajectories at various speeds. In another instance, the software may display a virtual or graphical representation of an avatar or a game character (i.e. third person view) which the user controls via the controller 600, such as using a directional pad. In this example, the software may also allow the user to toggle between controlling the user's character (i.e. third person view) as well as the writing/painting tool (i.e. first person view) with sufficient accuracy. Haptics may further enhance the experience. For instance, the software may compare the user's gesture(s) via the controller 600 with a one or more predetermined stored gesture(s). In an embodiment, the controller 600 be programmed to output a haptic effect (e.g. low frequency and magnitude vibration) as long as the user's gestures follow the stored gestures. Alternatively, the actuator(s) in the controller 600 may be programmed to output a haptic effect (e.g. jolts or low magnitude vibration) when the user's gestures deviate from the stored gestures to which they are compared to. Such use of haptics could be used to effectively train the user on certain painting techniques (e.g. applying broad strokes vs. short strokes) or even certain styles (e.g. impressionist vs. abstract).

In an embodiment, the software is designed to be a video game which allows the user to navigate through and explore a three dimensional open area city environment (e.g. Grand Theft Auto, Second Life) in which the user utilizes the controller 600 to navigate around the environment and draw or paint on virtual structures (e.g. water towers, train cars, government buildings, etc.) displayed in the environment. In this embodiment of the game, an objective may be to "tag" designated structures in the city, based on a mission. A "tag" may be the user's name, logo, symbol or design (hereinafter generally referred to as "design") which the user produces or designates. In an embodiment, the software allows the user to manually draw the design using the controller 600. The user is alternatively able to select a stored pre-drawn design, whereby the software automatically retrieves the stored design and tags it on the wall or structure whenever the user desires. Additionally or alternatively, the user can redraw the tag or draw a different design whenever it is desired. The game can be designed to award points based on the number of places where the user "tags" a wall or structure, whereby players gain fame (or infamy) based on the number of accumulated points.

The software may have a feature which allows online or offline multiplayer action in which other players can place their tag over an existing tag to gain more points and/or reduce the number of points awarded to the player who was "over-tagged". In an embodiment, the software preferably keeps track of the locations in the virtual environment where each of the users have tagged structures and puts a time stamp on each tag. The software thereby is able to award (or take away) points based on the stored locations, type of design, and/or the frequency of tags (or over-tags) within a period of time. Although the software may be designed such that the game is sandbox style, although the game may additionally or alternatively be designed to be mission based.

As described above, the software provides a virtual open environment in which the user is able to use the controller 600 to place virtual tags on virtual buildings. In another embodiment, the user is able to use the controller 600 in the real world to tag actual surfaces and structures using "invisible ink" or "invisible paint". In this embodiment, the controller 600 may include a global positioning system (GPS) module coupled to the transceiver which provides the user's location to one or more servers and/or host computers 690 when a structure is tagged. This uploaded information would preferably include the user's identity, a location of the tag, a time stamp of when the tag occurred, and a photo, description or other information of the tagged design itself.

In an embodiment, the controller 600 allows the user the freedom to paint or draw whatever is desired using the invisible ink. In particular, the software and controller 600 allow the user to take advantage of the user's artistic talents in replicating the user's painting or marking gestures to produce a finished art piece based on those gestures. In particular, the tip and/or body sensors 604A, 604B of the controller 600 track the motion of the controller 600 as the user is drawing or painting on an actual surface, whereby the processor stores the tracked information and processes the information to produce a replica of what the user had just drawn based on the positional values of the controller 600. In an embodiment, the information can be viewed immediately on the controller (or other device, such as the display screen 642 of the host computer 690) to show what the user's finished art work looks like by itself or virtually overlaid on the surface. A speaker 640A coupled to the host computer 690, or a speaker 640B co-located with the controller 600 may enhance the user experience by integrating sound effects.

It is also contemplated that the tag data is uploaded to one or more central servers and/or host computers in which the user can access, view, and compare the location and frequency of tags with other users in the system. The software preferably tracks tag data for every registered user, in which the users may access the software from their host computer or mobile device to see their tag history as well as other user's tag histories in the location. In particular, the software can pair up with existing mobile application software (e.g. Google Maps) in which the user can see on the mobile application the areas which have been tagged by one or more registered users. The software preferably allows the user to select on a particular "tag point" to see the identity of the user, the time which the "tag point" was tagged as well as be able to retrieve a photo or representation of the art work. The software would preferably allow the user to see how many points or tagging locations the user has accumulated (or lost due to over-tagging). The software is also capable of handling social networking applications.

In an embodiment, the software will allow users to share and compare their art or creations in a social-networked environment. Users will be able to find artists creating similar pieces, and the software will be able to make recommendations to view certain pieces by other artists based on interest levels, user profiles, and previously created art.

In an embodiment, the software will allow users to purchase virtual goods, in form of different colors, materials, brushes and other painting materials, as well as street artist materials, in form of spray cans, spray caps, etc.

In an embodiment, the software is configured to work with a viewer or camera device which allows an individual to actually visit a physical location where an item or structure has been tagged and view the art work through the viewer. FIG. 7 illustrates a block diagram of the viewer in accordance with an embodiment. As shown in FIG. 7, the viewer 700 preferably includes a processor 708, a GPS transceiver 745 coupled to the processor 708, a display 742 coupled to the processor 708, an optional speaker 740, and an optional actuator 706 coupled to the processor 708. Preferably, the viewer 700 includes a memory or other storage device 707 which stores at least the received information (i.e. tag data). In an embodiment, the viewer is a dedicated device whereas it is contemplated that the same features of the software may be loaded onto a device already having the hardware components shown in FIG. 7 (i.e. a mobile phone).

The GPS transceiver preferably communicates the location of the viewer with the host computer 790 or servers 795 via antenna 750 sending signals to a transponder 780, whereby either the host computer 790 or the viewer 700 compares the location of the viewer with recorded tag locations. Upon the viewer 700 being instructed that it is at a location of a tagged item or structure, the viewer is notified (visually, audibly, and/or by haptic effect). In an embodiment, the user is able to push a button or use a voice command to view the actual tagged art via the display 742 whereas the tagged art would normally be invisible to the naked eye.

The above described controllers and gaming configurations can be combined into a comprehensive game referred to as an "Art Hero" or a "Graffiti Hero", akin to the popular "Guitar Hero" game. Art Hero may be a gentler version of the Graffiti Hero game. Art Hero games may be more suited towards entertainment, training, creative pursuit etc., while Graffiti Hero may be more suited towards high-excitement multi-player gaming. In either Art Hero or Graffiti Hero, the user will preferably have a haptic-enhanced controller (paint brush, marker, spray can or other types of writing/painting instruments), and while actually or virtually painting on a game surface external to the controller, the user will have the realistic sensation of paint being used on a surface, the spray can being progressively lighter, the colors getting richer when a spray nozzle is being pressed harder, etc. In this type of games, haptic feedback can be used to create desired texture or signature patterns for the artist. The writing/painting concepts can be integrated to real-life adrenalin-driven experiences, such as the experience of playing Grand Theft Auto. For example, Graffiti Hero game may allow a user to work more efficiently under pressure when a "virtual" police raid is imminent. Various Graffiti artists may also compete against each other for fame and bragging rights by covering as much as buildings possible with their respective graffiti, or over-writing on a competitor's graffiti. In super-enhanced ultimate editions of the games, the users may be allowed to inhabit a virtual world similar to "Second Life".

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A system comprising:
a computer configured to run a software program designed to display a graphical simulation on a display, the software program configured to allow a user to generate visual art in the graphical simulation; and
a user graspable controller configured to be freely moveable in a three dimensional space, the user graspable controller comprising a sensor configured to track positional values of the user graspable controller in the three dimensional space and transmit a sensor signal representative of the positional values to the computer, and an actuator configured to output a haptic effect to the user upon receiving a control signal from a processor coupled to the user graspable controller, the user graspable controller being representative of a writing and painting instrument configured to generate the visual art, and the haptic effect being associated with use of the writing and painting instrument when the visual art is generated.

2. The system of claim 1, wherein the processor is configured to receive the sensor signals and provide the sensor signals to the computer.

3. The system of claim 1, wherein the user graspable controller is configured to have an outer shape in a form of a paint spray-can.

4. The system of claim 3, wherein the user graspable controller further comprises a nozzle sensor coupled to a nozzle, wherein the nozzle sensor is configured to send a nozzle sensor signal when the nozzle is pressed to indicate operation of the nozzle, the computer configured to update the visual art in response to the nozzle being pressed.

5. The system of claim 4, further comprising a second actuator coupled to the nozzle of the user graspable controller, wherein the second actuator outputs a haptic effect in response to receiving a control signal from a processor in communication with the computer.

6. The system of claim 1, wherein the user graspable controller is configured to have an outer shape in a form of a paint brush.

7. The system of claim 6, wherein the user graspable controller further comprises a tip sensor coupled to the a bristled tip of the paint brush, wherein the tip sensor is configured to send a tip sensor signal when the tip is pressed to indicate operation of the paint brush, the computer configured to update the visual art in response to the tip being pressed.

8. The system of claim 7, further comprising a second actuator coupled to the bristled tip of the paint brush, wherein the second actuator outputs a haptic effect in response to receiving a control signal from a processor in communication with the computer.

9. The system of claim 1, wherein the user graspable controller is configured to have an outer shape in a form of a marker.

10. The system of claim 9, wherein the user graspable controller further comprises a tip sensor coupled to the a tip of the marker, wherein the tip sensor is configured to send a tip sensor signal when the tip is pressed to indicate operation of the marker, the computer configured to update the visual art in response to the tip being pressed.

11. The system of claim 10, further comprising a second actuator coupled to the tip of the marker, wherein the second actuator outputs a haptic effect in response to receiving a control signal from a processor in communication with the computer.

12. The system of claim 1, wherein the user graspable controller comprises a wireless input/output port configured to communicate with the computer.

13. A game comprising:
- a user graspable controller configured to be freely moveable in a three dimensional space by a user, the user graspable controller comprising a position sensor configured to track a physical position of the user graspable controller in the three dimensional space, a processor coupled to the position sensor, and an actuator configured to output a haptic effect upon receiving a control signal from the processor, the user graspable controller configured to place a data tag at a location where the user designates via the controller, the user graspable controller configured to send a signal after the user graspable controller places the data tag, the user graspable controller being representative of a writing and painting instrument configured to generate the data tag, and the haptic effect being associated with use of the writing and painting instrument when the data tag is generated; and
- a host computer remote from the user graspable controller and configured to run a software program, wherein the host computer is configured to identify the user from the received signal and to store the location of the data tag, wherein information of the stored data tag and identity of the user is capable of being accessed from the host computer.

14. The game in claim 13, wherein the host computer is configured to store a time when the data tag was placed.

15. The game in claim 13, wherein the user graspable controller is configured to send the position signal wirelessly.

16. The game in claim 13, wherein the user graspable controller is a mobile phone.

17. The game in claim 13, wherein the user graspable controller is a media player.

18. A game comprising:
- a plurality of uniquely identifiable controllers configured to be freely moveable in a three dimensional space by respective users, each controller comprising a position sensor configured to track a physical position of the controller in the three dimensional space and a processor coupled to the position sensor, each controller configured to place a data tag on a surface at different user-designed locations, each controller configured to send a corresponding signal upon the controller placing the data tag, at least one controller further comprises an actuator configured to output a haptic effect upon receiving a control signal from the processor, the at least one controller being representative of a writing and painting instrument configured to generate the data tag, and the haptic effect being associated with use of the writing and painting instrument when the data tag is generated; and
- a host computer remote from the controllers and configured to run a software program, wherein the host computer is configured to identify each user from each received signal and to store the location of the data tag, wherein information of the stored data tag and identity of the users is capable of being accessed from the host computer.

19. The game in claim 18, wherein the host computer is configured to store a time when the data tag was placed.

20. The game in claim 18, wherein at least one controller is configured to send the position signal wirelessly.

21. The game in claim 18, wherein at least one controller is a mobile phone.

22. The game in claim 18, wherein at least one controller is a media player.

* * * * *